(12) United States Patent
Takada (10) Patent No.: US 12,444,019 B2
(45) Date of Patent: Oct. 14, 2025

(54) IMAGE PROCESSING APPARATUS, IMAGE PROCESSING METHOD, AND MEDIUM

(71) Applicant: CANON KABUSHIKI KAISHA, Tokyo (JP)

(72) Inventor: Yosuke Takada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 555 days.

(21) Appl. No.: 17/847,222

(22) Filed: Jun. 23, 2022

(65) Prior Publication Data

US 2022/0414826 A1 Dec. 29, 2022

(30) Foreign Application Priority Data

Jun. 24, 2021 (JP) ................. 2021-105036

(51) Int. Cl.
*G06T 3/4038* (2024.01)
*G06T 3/4015* (2024.01)
*G06T 3/4046* (2024.01)
*G06T 5/50* (2006.01)

(52) U.S. Cl.
CPC .......... *G06T 3/4038* (2013.01); *G06T 3/4015* (2013.01); *G06T 3/4046* (2013.01); *G06T 5/50* (2013.01); *G06T 2207/20212* (2013.01)

(58) Field of Classification Search
CPC ....... G06T 3/4015; G06T 3/4046; G06T 5/60; G06T 3/4007; G06T 3/4038; G06T 5/50; G06T 2207/20212; G06T 2207/20221
See application file for complete search history.

(56) References Cited

U.S. PATENT DOCUMENTS

| 9,552,624 | B2 * | 1/2017 | Kunze | ................. H04N 25/134 |
| 2006/0098253 | A1 * | 5/2006 | Masuno | ............... H04N 1/6027 358/518 |
| 2019/0387205 | A1 * | 12/2019 | Chuang | ................. H04N 25/60 |
| 2020/0126190 | A1 * | 4/2020 | Lebel | ....................... G06T 5/60 |
| 2021/0374527 | A1 | 12/2021 | Takada | |
| 2022/0092357 | A1 | 3/2022 | Takada | |

FOREIGN PATENT DOCUMENTS

JP 2021-087201 A 6/2021
WO WO-2022141265 A1 * 7/2022

OTHER PUBLICATIONS

Gharbi M et al., Deep Joint Demosaicking and Denoising, 2016, Association for Computing Machinery (Year: 2016).*

(Continued)

*Primary Examiner* — Gandhi Thirugnanam
*Assistant Examiner* — Anthony J Rodriguez
(74) *Attorney, Agent, or Firm* — Carter, DeLuca & Farrell LLP (57) ABSTRACT

An image processing apparatus is disclosed. The image processing apparatus acquires a mosaic image. The image processing apparatus generates a first demosaic image by subjecting the mosaic image to a first demosaicing process in which a neural network is used, and generates a second demosaic image by subjecting the mosaic image to a second demosaicing process that is different from the first demosaicing process. The image processing apparatus generates a composite image in which the first demosaic image and the second demosaic image are combined.

11 Claims, 7 Drawing Sheets

(56) References Cited

OTHER PUBLICATIONS

Espacenet English Translation of WO-2022141265-A1 Description (Year: 2022).*
Michael Gharbi et al., "Deep joint demosaicking and denoising" ACM Transactions on Graphics (Dec. 2016) pp. 1-12, vol. 35, Issue 6, Article No. 191.
Notice of Reasons for Refusal issued by the Japanese Patent Office on Mar. 21, 2025 in corresponding JP Patent Application No. 2021-105035, with English translation.

* cited by examiner

IMAGE PROCESSING APPARATUS, IMAGE PROCESSING METHOD, AND MEDIUM

BACKGROUND OF THE INVENTION

Field of the Invention

The present invention relates to an image processing apparatus, an image processing method, and a medium, in particular to an image demosaicing process.

Description of the Related Art

Through a color filter, light of a specific wavelength enters each pixel of an image sensor used in a digital image-capturing apparatus such as a digital camera. For example, if a color filter having a Bayer pattern is used, mosaic image data in which each pixel has a pixel value corresponding to one of the colors R, G, and B can be obtained from the image sensor. Then, color image data in which each pixel has pixel values respectively corresponding to the plurality of colors can be obtained by performing, for each pixel of the mosaic image data, various types of signal processing such as a demosaicing process for obtaining pixel values corresponding to the two other colors.

As one method for the demosaicing process, there is a method of performing linear interpolation or nonlinear interpolation based on pixel values of the same color in the neighborhood. As another method for the demosaicing process, an interpolation method in which deep learning technology is used has been proposed by Gharbi (Michael Gharbi et al. "Deep joint demosaicking and denoising", ACM Transactions on Graphics, Vol. 35, Issue 6, Article No.: 191 (2016).). Specifically, Gharbi discloses a method of extracting, from training data, only some difficult data with which artifacts, etc., occur when demosaicing is performed, and training a CNN-based demosaicing network based on the difficult data.

SUMMARY OF THE INVENTION

According to an embodiment of the present invention, an image processing apparatus comprises one or more processors and one or more memories storing one or more programs which cause the one or more processors to: acquire a mosaic image; generate a first demosaic image by subjecting the mosaic image to a first demosaicing process in which a neural network is used; generate a second demosaic image by subjecting the mosaic image to a second demosaicing process that is different from the first demosaicing process; and generate a composite image in which the first demosaic image and the second demosaic image are combined.

According to another embodiment of the present invention, an image processing apparatus comprises one or more processors and one or more memories storing one or more programs which cause the one or more processors to: acquire a mosaic image; generate a first demosaic image by subjecting the mosaic image to a first demosaicing process in which a neural network is used; detect a region of the first demosaic image that has a checkered pattern as a detected region; and perform a correction process on the detected region of the first demosaic image.

According to still another embodiment of the present invention, an image processing method comprises: acquiring a mosaic image; generating a first demosaic image by subjecting the mosaic image to a first demosaicing process in which a neural network is used; generating a second demosaic image by subjecting the mosaic image to a second demosaicing process that is different from the first demosaicing process; and generating a composite image in which the first demosaic image and the second demosaic image are combined.

According to yet another embodiment of the present invention, anon-transitory computer-readable medium stores one or more programs which, when executed by a computer comprising one or more processors and one or more memories, cause the computer to: acquire a mosaic image; generate a first demosaic image by subjecting the mosaic image to a first demosaicing process in which a neural network is used; generate a second demosaic image by subjecting the mosaic image to a second demosaicing process that is different from the first demosaicing process; and generate a composite image in which the first demosaic image and the second demosaic image are combined.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The present inventor found out that, while false color and moiré are less likely to occur with a demosaicing process in which a neural network, such as the deep learning disclosed in Gharbi, is used, a false pattern that does not originally exist is likely to occur with such a demosaicing process.

According to one embodiment of the present invention, a demosaicing process can be performed with high accuracy while suppressing a false pattern.

Embodiment 1

(CNN)

An image processing apparatus according to one embodiment performs a demosaicing process in which a neural network is used. First, a convolutional neural network (CNN) will be described as one example of a neural network that can be used in one embodiment. CNNs are used in Gharbi and in image processing techniques to which deep learning technology is applied. A CNN is a training-based image processing technique in which a process is repeated in which a nonlinear computation is performed after convolution of filters and image data. The filters are also called local receptive fields (LPFs). The image data obtained by performing a nonlinear computation after convolution of the filters and image data is called feature maps. Furthermore, the filters are generated through training (learning). The training is performed using training data (training images or data sets) consisting of a pair of input image data and output image data. Simply stated, the training refers to a process for generating, from training data, values of the filters that can accurately convert input image data into corresponding output image data. This will be described in detail later.

If the image data has a plurality of color channels (for example, R, G, and B) or the feature maps are formed from a plurality of pieces of image data, the filters used for convolution may also have a corresponding number of channels. That is, the filters are expressed by a four-dimensional array having a dimension that is the number of channels, in addition to dimensions that are the vertical and horizontal sizes, and the number of filters. The process in which a nonlinear computation is performed after convolution of the filters and image data (or feature maps) is expressed as a unit which is called a layer. For example, a specific feature map and a specific filter are respectively called a feature map of an $n^{th}$ layer and a filter of the $n^{th}$ layer. Furthermore, a CNN in which a set consisting of convolution of filters and image data, and a nonlinear computation is repeated three times, for example, is referred to as a CNN having a three-layer network structure.

Such a combination of convolution and nonlinear computation can be expressed using Formula (1) below.

[Math. 1]

$$X_n^{(l)} = f\left(\sum_{k=1}^{K} W_n^{(l)} * X_{n-1}^{(l)} + b_n^{(l)}\right) \quad (1)$$

In Formula (1), $W_n$ indicates a filter of the $n^{th}$ layer, $b_n$ indicates a bias of the $n^{th}$ layer, f indicates a nonlinear operator, $X_n$ indicates a feature map of the $n^{th}$ layer, and * indicates a convolution operator. Note that (l) indicates that the filter or feature map is the $l^{th}$ filter or feature map. The filters and biases are generated through the later-described training, and are also collectively referred to as network parameters.

While the type of nonlinear computation to be used is not particularly limited, a sigmoid function or a rectified linear unit (ReLU) can be used, for example. A nonlinear computation according to ReLU can be expressed using Formula (2) below.

[Math. 2]

$$f(X) = \begin{cases} X & \text{if } 0 \leq X \\ 0 & \text{otherwise} \end{cases} \quad (2)$$

That is, a ReLU process is a nonlinear process in which negative element values of an input vector X are converted into zero, and positive element values of the input vector X are left as-is.

Next, training of a CNN will be described. A CNN can be trained by minimizing an objective function that can be obtained for training data consisting of a combination of an input image (training input image) and a corresponding output image (supervisory image). The objective function can be expressed using Formula (3) below, for example.

[Math. 3]

$$L(\theta) = \frac{1}{n}\sum_{i=1}^{n}\|F(X_i; \theta) - Y_i\|_2^2 \quad (3)$$

Here, the objective function L is a loss function for measuring the error between a correct answer (i.e., an output image) and an inference (i.e., a result of the CNN process for an input image). Furthermore, $Y_i$ and $X_i$ respectively indicate the $i^{th}$ output image and the $i^{th}$ input image. F is a function collectively expressing the computations (Formula (1)) performed in the CNN layers. $\theta$ indicates the network parameters (filters and biases). Furthermore, $\|Z\|_2$ indicates the L2 norm of a vector Z, and, simply stated, is the square root sum of squares of the elements of the vector Z. In the objective function in Formula (3), the square of the L2 norm is used. Furthermore, n is the number of pieces of training data (sets of an input image and an output image) used for training. Typically, the total number of pieces of training data is large. Thus, in training in which the stochastic gradient descent (SGD) is used, some pieces of training data can be randomly selected and used to minimize the objective function. According to such a method, the calculation load in training in which a large quantity of training data is used can be reduced.

Various methods, such as the momentum method, AdaGrad method, AdaDelta method, and Adam method, can be used as the method for minimizing (optimizing) the objective function. For example, the Adam method according to Formula (4) below can be adopted.

[Math. 4]

$$g = \frac{\partial L}{\partial \theta_i^t} \quad (4)$$

$$m = \beta_1 m + (1 - \beta_1)g$$

$$v = \beta_2 v + (1 - \beta_2)g^2$$

$$\theta_i^{t+i} = \theta_i^t - \alpha \frac{\sqrt{1-\beta_2^t}}{(1-\beta_1)} \frac{m}{(\sqrt{v} + \varepsilon)}$$

In Formula (4), $\theta_i^t$ indicates the $i^{th}$ network parameters in the $t^{th}$ iteration, and g is the gradient of the loss function L with respect to $\theta_i^t$. Furthermore, m and v are moment vectors, $\alpha$ is the base learning rate, $\beta_1$ and $\beta_2$ are hyper parameters, and $\varepsilon$ is a small constant that can be set as appropriate. While the optimization method to be used is not particularly limited, the optimization method to be used can be selected in accordance with the purpose, etc., because it is known that optimization methods are different from one another in terms of convergence and also give rise to a difference in training time.

The specific CNN configuration is not particularly limited. ResNet used in the field of image recognition, RED-Net used in the field of super-resolution, etc., can be mentioned as examples of specific configurations of networks in which CNNs are used. In any case, processing accuracy is increased by using a multilayer CNN and performing filter convolution many times. For example, ResNet has a network structure including a path for shortcutting convolution layers, and realizes high-accuracy recognition coming close to the human recognition rate by a multilayer network of 152 layers. Note that, simply stated, the reason why processing accuracy is increased by a multilayer CNN is because the CNN can express the nonlinear relation between input and output by repeating nonlinear computation many times.

(Configuration of Image Processing Apparatus)

Figure 7A:
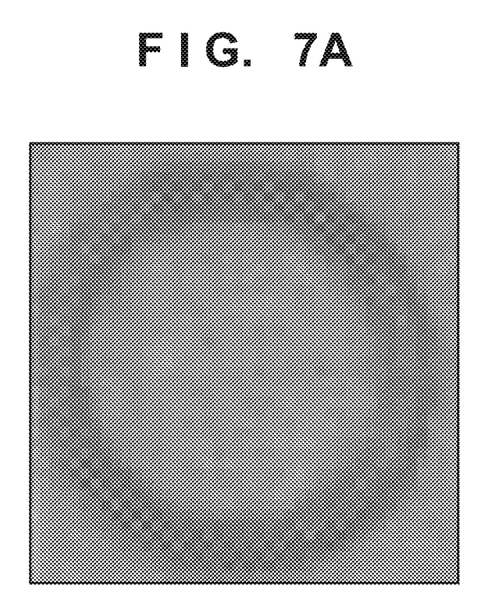
FIGS. 7A and 7B are diagrams illustrating one example of a false pattern.
Figure 7B:
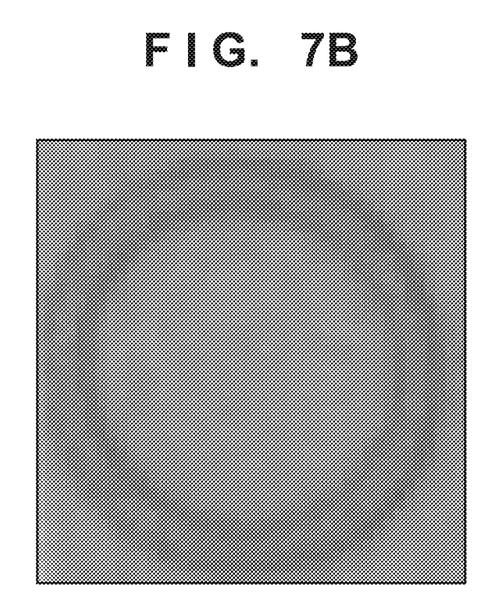

The image processing apparatus according to the present embodiment can suppress an image defect such as a false pattern by combining a second demosaic image and a first demosaic image that is generated using a neural network or deep learning. As mentioned above, the present inventor found out that, while image defects such as false color and moiré are excellently suppressed when a demosaicing process is performed using a neural network or deep learning, a new image defect such as a false pattern is likely to occur with such a demosaicing process. One example of a false pattern is illustrated in FIGS. 7A and 7B. FIG. 7A illustrates the result when RAW image data indicating a circle was subjected to a demosaicing process using a neural network, and FIG. 7B illustrates the result when the RAW image data was subjected to a typical demosaicing process without using a neural network. As can be seen in FIG. 7A, a checkered false pattern is formed following a Bayer pattern in the demosaic image obtained using a neural network. The reason for this is because data-driven processing such as a neural network or deep learning has been performed, and specifically, it can be considered that the image defect has occurred due to an insufficiency in training data amount, training data bias, training order, or the like. In the present embodiment, in order to obtain a high-accuracy demosaic image in which a false pattern is suppressed, the second demosaic image, which is obtained through a second demosaicing process with which a false pattern is less likely to occur, is combined with the first demosaic image.

Figure 1:
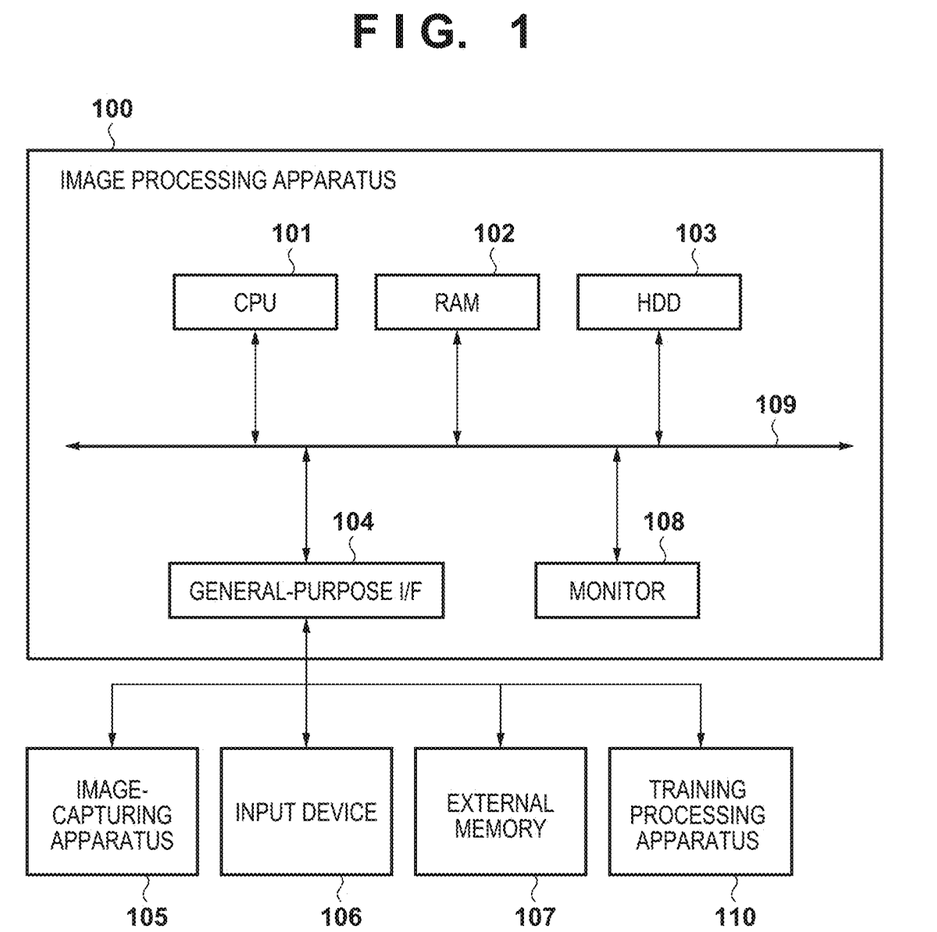
FIG. 1 is a block diagram illustrating an example of a hardware configuration of an image processing apparatus according to one embodiment.

The image processing apparatus according to embodiment 1 can be realized using a computer including a processor and a memory. FIG. 1 illustrates one example of a hardware configuration of the image processing apparatus according to embodiment 1. For example, the image processing apparatus 100 is a computer such as a PC, and includes a CPU 101, a RAM 102, a HDD 103, a general-purpose interface (I/F) 104, a monitor 108, and a main bus 109. Furthermore, an image-capturing apparatus 105 such as a camera, an input device 106 such as a mouse or a keyboard, and an external memory 107 such as a memory card are connected to the main bus 109 of the image processing apparatus 100 via the general-purpose I/F 104. A training processing apparatus 110 that trains a neural network to be used for a demosaicing process is further connected to the general-purpose I/F 104.

The CPU 101 realizes various types of processes such as those described in the following by operating in accordance with various types of software (computer programs) stored in the HDD 103. First, the CPU 101 causes the monitor 108 to display a user interface (UI) by decompressing an image processing application program stored in the HDD 103 to the RAM 102 and executing the program. Subsequently, various types of data stored in the HDD 103 or the external memory 107, image data acquired by the image-capturing apparatus 105, user instructions from the input device 106, etc., are transferred to the RAM 102. Furthermore, in accordance with the processing by the image processing application, computation processing in which the data stored in the RAM 102 is used is performed based on instructions from the CPU 101. The results of the computation processing can be displayed on the monitor 108 and can be stored to the HDD 103 or the external memory 107. Note that image data stored in the HDD 103 or the external memory 107 may be transferred to the RAM 102. Furthermore, image data transmitted from a server via an unillustrated network may be transferred to the RAM 102.

In the following, an embodiment in which, in the image processing apparatus 100 having a configuration as described above. RAW image data input to the image processing application is developed and the developed image data is output based on instructions from the CPU 101 will be described. The functions of the units described in the following and illustrated in FIG. 2 for example can be realized by a processor such as the CPU 101 executing programs stored in a memory such as the RAM 102 or the HDD 103.

Figure 2:
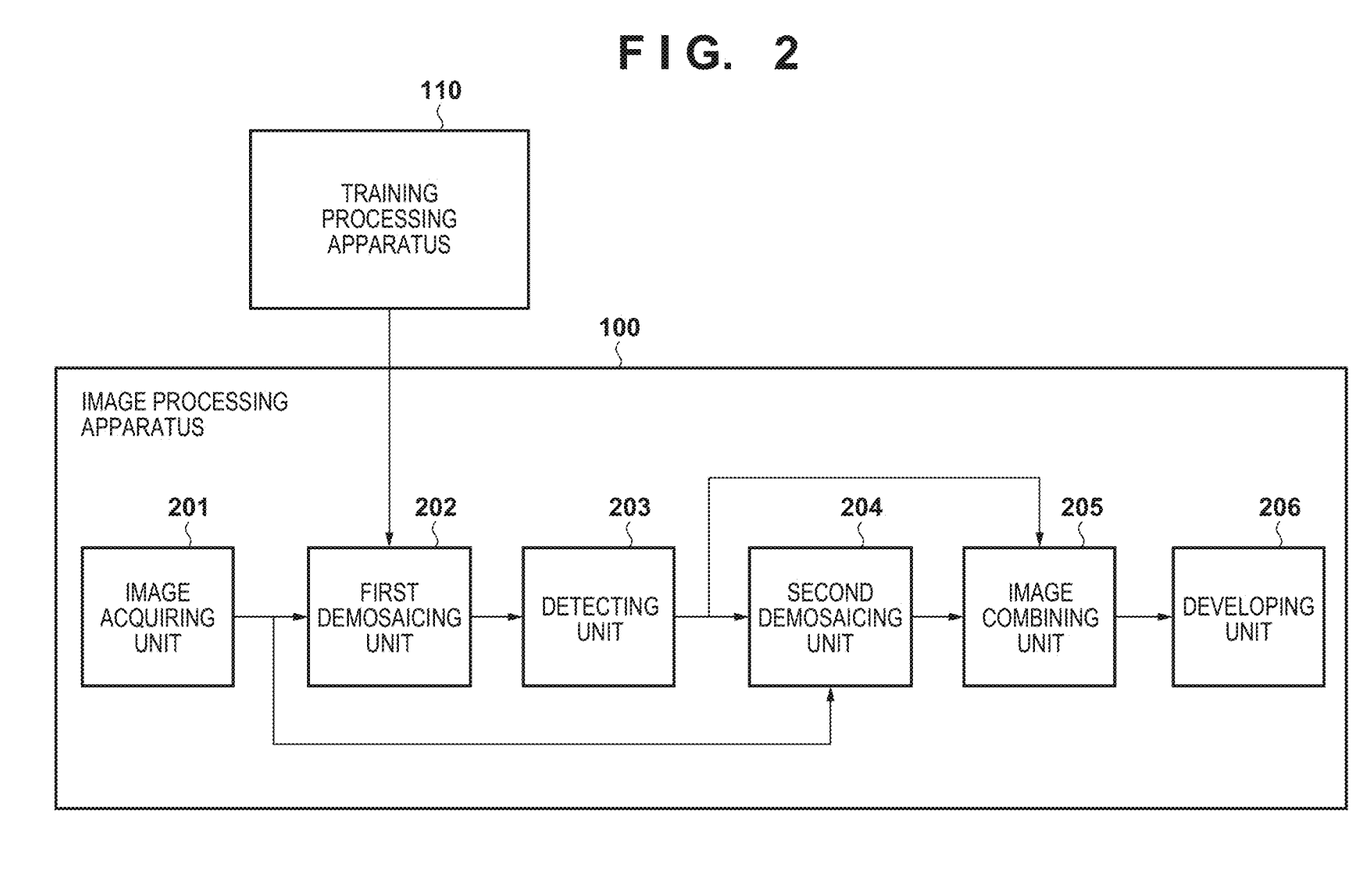
FIG. 2 is a block diagram illustrating an example of a functional configuration of the image processing apparatus according to one embodiment.

FIG. 2 is a block diagram illustrating an example of a functional configuration of the image processing apparatus 100 according to the present embodiment. As illustrated in FIG. 2, the image processing apparatus 100 includes an image acquiring unit 201, a first demosaicing unit 202, a second demosaicing unit 204, and an image combining unit 205. Furthermore, the image processing apparatus 100 may include a detecting unit 203 and a developing unit 206. Note that the configurations illustrated in FIGS. 2 and 5 can be modified or altered as appropriate. For example, one functional unit may be split up into a plurality of functional units, or two or more functional units may be integrated into one functional unit. Furthermore, the configurations illustrated in FIGS. 2 and 5 may be realized using two or more apparatuses. In this case, the apparatuses can realize the later-described processes by being connected via a circuit or a wired or wireless network and cooperatively operating while performing data communication with one another.

The image acquiring unit 201 acquires a mosaic image. In the present embodiment, the image acquiring unit 201 acquires, as mosaic image data, RAW image data in which each pixel has information for one color. On the other hand, the mosaic image data may be data of pixel values of an image for each of one or more planes, the image having periodically repeating pixels with set pixel values and pixels without set pixel values (for example, data of each of the R, G, and B planes based on a Bayer pattern). In the following, description will be provided on the presumption that the RAW image data has been captured using a Bayer-pattern color filter in which each pixel has information for one color. However, the present invention is also applicable to RAW images captured using color filters having other patterns.

The first demosaicing unit 202 generates a first demosaic image by subjecting the mosaic image to a first demosaicing process in which a neural network is used. In the present embodiment, the first demosaicing unit 202 generates a first demosaic image in which color information has been interpolated by performing, on the RAW image data acquired by the image acquiring unit 201, a demosaicing process in which a neural network is used. In the present embodiment, as a neural network, a demosaicing network model that is a trained model output by the training processing apparatus 110 is used. A demosaicing network model refers to the architecture and parameters (coefficients) of the neural network. While a neural network based on a multilayer CNN as described above is used as a demosaicing network model in the present embodiment, the neural-network architecture is not limited to that based on a CNN.

Note that the training processing apparatus 110 can train a neural network as described in the following. First, mosaic image data (training input image data) is input to the neural network, and the error between the output from the neural network and demosaic image data (supervisory image data) is assessed. Then, based on this error, the parameters of the neural network are updated by backpropagation. A trained model can be obtained by repeating this process. Here, data of any image can be used as the supervisory image data, and for example, an image without many image defects caused by a demosaicing process that has been obtained by subjecting RAW image data to a size-reduction process without performing a demosaicing process can be used, for example. The training input image data can be generated by sampling the supervisory image data in accordance with a color filter pattern.

The second demosaicing unit 204 generates a second demosaic image by subjecting the mosaic image to a second demosaicing process that is different from the first demosaicing process. In the present embodiment, the second demosaicing unit 204 generates a second demosaic image in which color information has been interpolated by performing the second demosaicing process on the RAW image data acquired by the image acquiring unit 201. The second demosaicing process is not limited to that of a particular type. For example, pixel values corresponding to each pixel can be calculated by performing, on sparse data of each of the colors R, G, and B, linear interpolation based on pixel values of the same color in the neighborhood. Specifically, linear interpolation can be performed by applying a linear filter to image data of each of the R, G, and B planes. Also, as other methods, interpolation using a median process may be performed, or nonlinear interpolation (for example, the ACPI method) in which adaptive interpolation based on edge analysis is performed may be used. Furthermore, a trained model that is different from the trained model used in the first demosaicing process may be used. For example, the trained model to be used in this case may be trained so as to suppress a false pattern more strongly compared to false color or moiré.

The image combining unit 205 generates a composite image in which the first demosaic image and the second demosaic image are combined. The combining method is not particularly limited. In the present embodiment, the second demosaic image is combined with a region (defect region) of the first demosaic image in which an image defect is detected. Therefore, the image processing apparatus 100 according to the present embodiment may include the detecting unit 203, which detects an image defect from the first demosaic image.

The detecting unit 203 detects a region having a specific attribute from the first demosaic image. In the present embodiment, the detecting unit 203 can detect a region (defect region) in which an image defect is present from the first demosaic image. In particular, since a false pattern is likely to occur in a demosaicing process in which a neural network is used, the detecting unit 203 can detect a region having a specific pattern from the first demosaic image. In the following, a region detected by the detecting unit 203 is called a detected region.

Thus, the image combining unit 205 can combine the first demosaic image and the second demosaic image based on the result of the detection by the detecting unit 203. For example, the image combining unit 205 can superimpose, on a detected region in the first demosaic image, a corresponding portion of the second demosaic image. The composite image obtained in such a manner includes the second demosaic image at the portion corresponding to the detected region and includes the first demosaic image at portions corresponding to regions other than the detected region. The processing by the detecting unit 203 and the image combining unit 205 will be described in detail later.

The developing unit 206 outputs a development process result by subjecting the demosaic image composited by the image combining unit 205 to a development process. The development process is not limited to that of a particular type, and may be one or more among a noise reduction process, a dynamic-range adjustment process, a gamma correction process, a sharpness process, and a color adjustment process, for example.

(Flow of Image Processing)

The processes performed by the image processing apparatus 100 according to the present embodiment will be described with reference to the flowchart in FIG. 3. The processes in the flowchart illustrated in FIG. 3 can be realized by a processor such as the CPU 101 executing programs stored in a memory such as the RAM 102 or the HDD 103.

In step S301, the image acquiring unit 201 acquires RAW image data from the image-capturing apparatus 105, the HDD 103, the external memory 107, or the like. Furthermore, the image acquiring unit 201 performs preprocessing such as a white balance process or an offset-adding process on the RAW image data.

In step S302, as mentioned above, the first demosaicing unit 202 subjects the RAW image data preprocessed in step S301 to the first demosaicing process using the trained model, and outputs a first demosaic image in which color information has been interpolated. For example, as illustrated in FIG. 4A, first demosaic image data is obtained by a demosaicing process being performed on RAW image data 400. Furthermore, demosaic image data 410R, 410G, and 410B for the respective colors R, G, and B is obtained by splitting the first demosaic image data into the three channels R, G, and B.

In step S303, the detecting unit 203 detects, from the first demosaic image, a defect region in which an image defect is present. By using a spatial filter, the detecting unit 203 can detect a region in which a specific pattern is present as a defect region. In the following, a spatial filter that detects image defects is referred to as a detection filter.

Figure 4A:
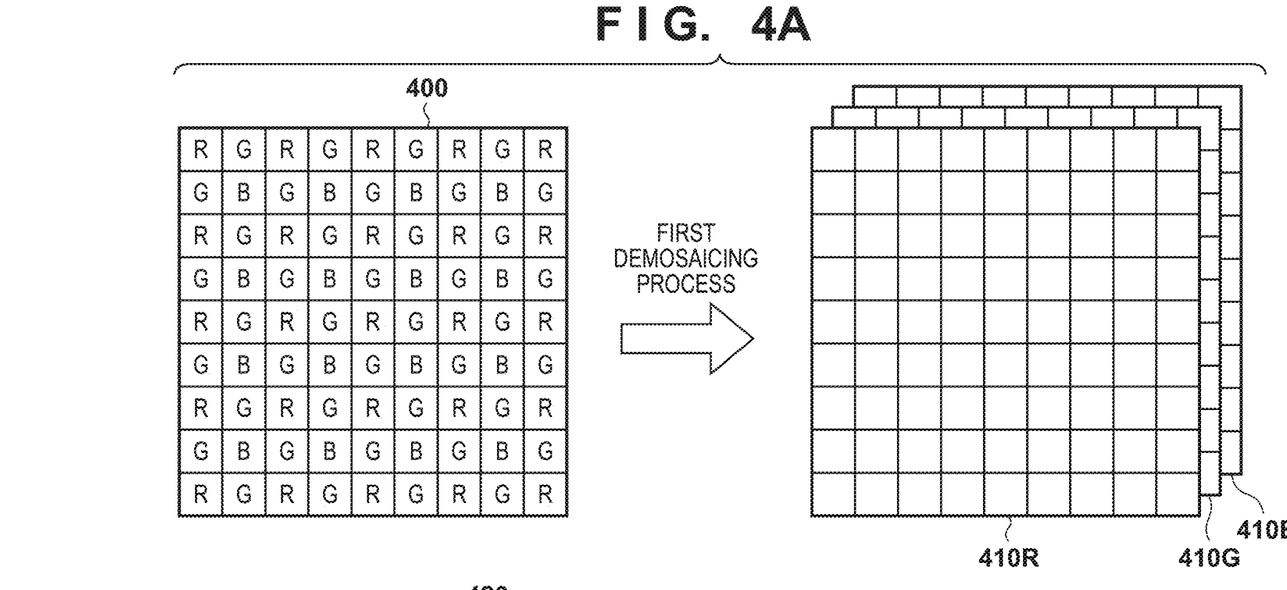
FIGS. 4A and 4B are diagrams for describing a process for detecting a predetermined pattern.
Figure 4B:
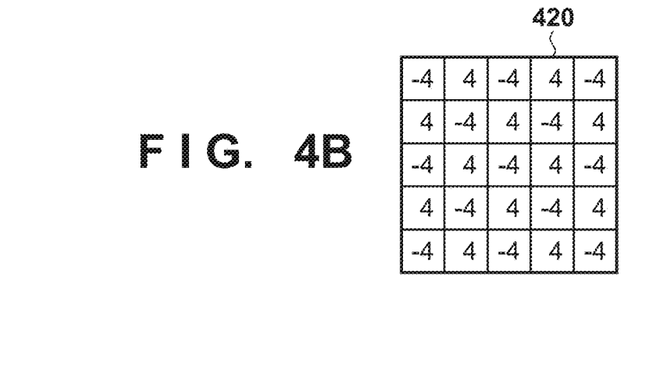

The present inventor found out that, when a mosaic image that is based on a predetermined color pattern is subjected to a demosaicing process using a neural network, a false pattern that is correlated with the predetermined color pattern is likely to occur. For example, when a mosaic image that is based on a Bayer pattern is subjected to a demosaicing process as described above, a checkered false pattern that is correlated with the Bayer pattern is likely to occur. Thus, in this example, the detecting unit 203 detects, as the specific pattern, a pattern (for example, a checkered pattern) that is correlated with a predetermined color pattern. In order to detect such a pattern, a detection filter in which filter coefficients correlated with the Bayer pattern are set can be used. FIG. 4B illustrates a 5×5 sized filter that is one example of such a detection filter. However, the size and coefficients of the detection filter are not particularly limited, and a filter having a size of 3×3 or larger can be used, for example. Also, in place of the detection filter illustrated in FIG. 4B, in which 4 or −4 are set as coefficients, a detection filter in which positive and negative values are repeated every other pixel in each of the vertical and horizontal directions may be used. Furthermore, the coefficients in the defect detection filter may be set so that values toward the center are greater and values toward the ends are smaller.

The detecting unit 203 can apply the detection filter to each of the demosaic image data 410R, 410G, and 410B. Thus, the detecting unit 203 can generate, for each channel, a map indicating the intensity of the specific pattern. Furthermore, the detecting unit 203 can detect a defect region based on the intensity of the specific pattern detected for each of the channels R, G, and B. Here, noise such as isolated points may occur in the maps, and in order to prevent such noise from being detected as defect regions, the detecting unit 203 can apply a noise removal filter to the map for each channel. A median filter can be used as the noise removal filter. Furthermore, since G-channel pixel values tend to be large in image data, the weight of the intensity detected for the G channel may be made greater than the weight of the intensity detected for the R and B channels in the detection of a defect region. For example, the intensity values in the G-channel map may be multiplied by a coefficient greater than one so that the G-channel weight is increased in the detection of the specific pattern.

Furthermore, for each pixel, the detecting unit 203 can extract the minimum value among intensities of the specific pattern in the channels and compare the minimum value with a preset threshold th (for example, th=100). If the minimum value detected for a pixel is greater than or equal to the threshold th, the pixel can be determined as belonging to a defect region.

In step S304, the detecting unit 203 determines whether or not a defect region has been detected from the first demosaic image. Processing proceeds to step S305 if a defect region has been detected, and otherwise proceeds to step S307.

In step S305, as mentioned above, the second demosaicing unit 204 subjects the RAW image data preprocessed in step S301 to the second demosaicing process.

In step S306, the image combining unit 205 combines the first demosaic image and the second demosaic image. Here, the image combining unit 205 can superimpose the second demosaic image on the detected region detected from the first demosaic image.

However, the combining method is not limited to this method. For example, a transition region may be set outside the detected region. Such a transition region can be set through a process of expanding the detected region by D pixels (for example, D=10). Furthermore, a composite image obtained by combining the first demosaic image and the second demosaic image using alpha blending may be applied to a portion of the composite demosaic image that corresponds to the transition region. The composite image obtained in such a manner includes, in the periphery of the detected region, an image in which the first demosaic image and the second demosaic image are blended. Also, the composite image includes the second demosaic image at the portion corresponding to the detected region, and includes the first demosaic image at portions corresponding to regions other than the detected region and the transition region. Furthermore, as a different method, the first demosaic image and the second demosaic image may be blended so that the weight of the second demosaic image is greater in the detected region than at the outside of the detected region.

In step S307, the developing unit 206 outputs a development process result by performing a development process on the composite image data output in step S306. The destination to which the result is output is not particularly limited, and may for example be the HDD 103, the external memory 107, or another device that is connected to the general-purpose I/F 104 (for example, an external device connected to the image processing apparatus 100 via a network).

Figure 3:
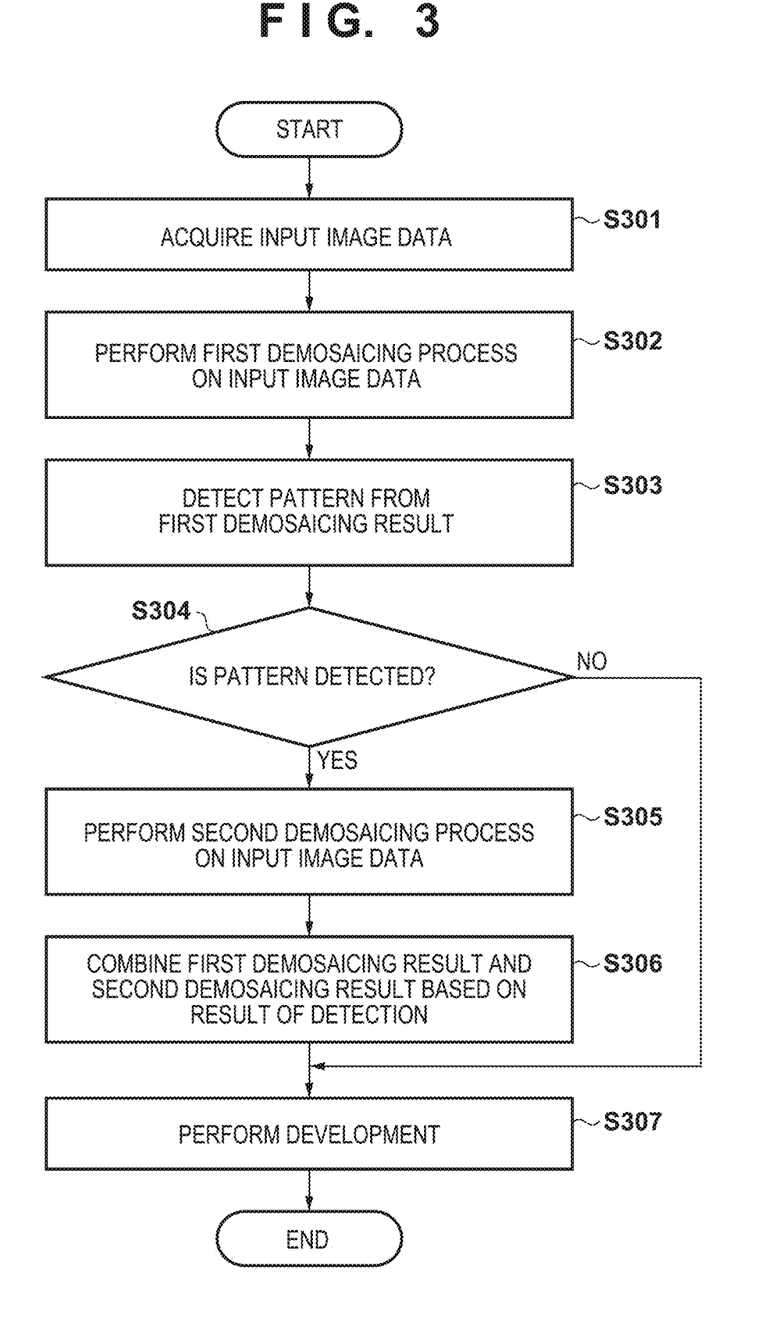
FIG. 3 is a flowchart illustrating a flow of image processing according to one embodiment.

Note that, while the second demosaicing process (step S305) is performed in series after the first demosaicing process (step S302) in the example in FIG. 3, the first demosaicing process and the second demosaicing process may be performed in parallel. Furthermore, while the second demosaicing process is performed on the entire mosaic image, the second demosaicing process may be performed only on a part of the mosaic image corresponding to the detected region detected in step S303.

In such a manner, according to the present embodiment, a high-accuracy demosaic image in which a false pattern is suppressed can be obtained by combining, with the first demosaic image, the second demosaic image, in which a false pattern is less likely to occur. In particular, a false pattern can be effectively suppressed by detecting a defect region having a false pattern that is likely to occur in a demosaicing process obtained using a neural network or a deep learning technique, and applying the result of a different demosaicing process to the defect region.

Embodiment 2

In embodiment 1, the first demosaic image and the second demosaic image were combined based on the result of detection of a specific pattern. On the other hand, the present inventor found out that, in a demosaicing process in which a neural network or deep learning is used, an image defect such as a false pattern is likely to occur in a region having a specific hue. In view of this, in embodiment 2, a hue with which a defect is likely to occur in a demosaicing process in which a trained model is used is specified in advance, and the first demosaic image and the second demosaic image are combined based on the result of detection of a region having this hue. In the following, description will be provided focusing on differences from embodiment 1, and description will be omitted for portions that are common between embodiments 1 and 2.

Figure 5:
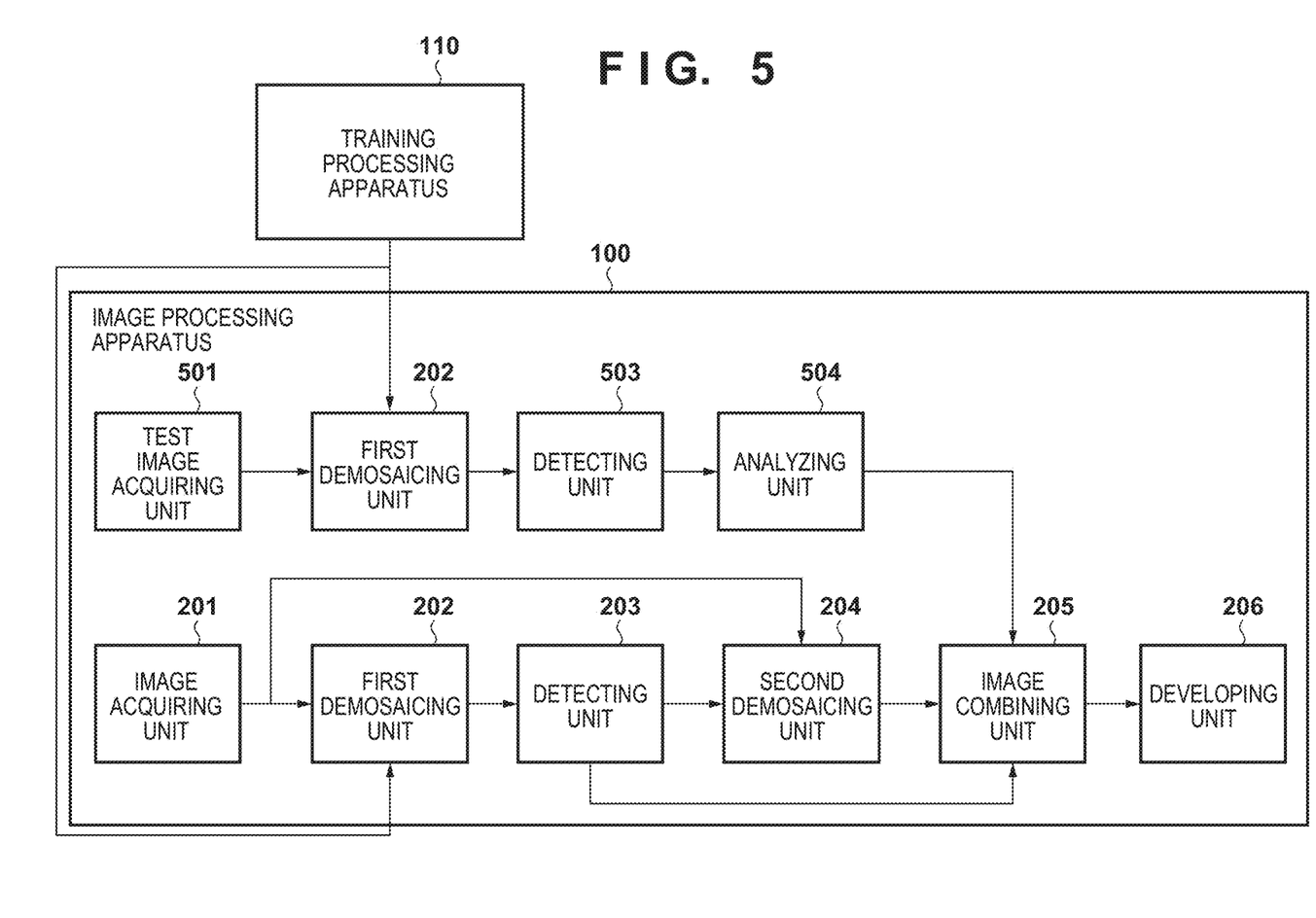
FIG. 5 is a block diagram illustrating an example of a functional configuration of an image processing apparatus according to one embodiment.

FIG. 5 is a block diagram illustrating an example of a functional configuration of an image processing apparatus 100 according to embodiment 2. The functions of the image acquiring unit 201, the first demosaicing unit 202, the second demosaicing unit 204, the image combining unit 205, and the developing unit 206 are similar to those in embodiment 1, and differences will be described later.

A test image acquiring unit 501 acquires test image data, and generates test mosaic image data by performing a mosaicing process on the test image data. In such a manner, mosaic image data having the same data format as the mosaic image data input to the neural network can be generated. As the test image data, RGB image data that is not mosaic image data can be used, for example. While the test image data is not limited to that of a particular kind, the test image data may be image data in which a symbol or a figure is drawn and which is made up of a combination of various hues. For example, the test image data may be data of an image made up of a symbol or figure portion of one color and a background portion of a different color. Furthermore, as the mosaicing process performed on the test image data, a sampling process based on a color filter pattern such as a Bayer pattern can be performed, and in this case, test mosaic image data having the Bayer pattern can be output.

In addition to subjecting the mosaic image to the first demosaicing process, the first demosaicing unit 202 generates a test demosaic image by subjecting the test mosaic image to the first demosaicing process, in which a neural network is used. The first demosaicing process is similar to that in embodiment 1.

A detecting unit 503 detects a region of the test demosaic image having a specific attribute. In the present embodiment, similarly to the detecting unit 203 in embodiment 1, the detecting unit 503 can detect a defect region from the first demosaic image, and can detect a region having a specific pattern such as a checkered pattern, for example.

An analyzing unit 504 determines the hue of the defect region detected by the detecting unit 503. Furthermore, the analyzing unit 504 records the hue of the defect region that has been determined. Specifically, the analyzing unit 504 can convert a color value of the defect region in the RGB color space into the HSV color space to extract a hue value (H: 0 to 180), and record the hue value to a hue information file.

The detecting unit 203 detects a region having a specific attribute in the first demosaic image obtained by the first demosaicing unit 202 subjecting the mosaic image data to the first demosaicing process. For example, the detecting unit 203 can detect a region having a hue that is similar to the hue of the defect region determined by the analyzing unit 504.

In the present embodiment, the detecting unit 203 detects a region having a specific hue from the first demosaic image. Here, as information indicating the specific hue, the defect-region hue information recorded by the analyzing unit 504 can be used. Specifically, the detecting unit 203 can detect a region having a hue similar to the hue recorded in the hue information file. Similarly to embodiment 1, a region detected by the detecting unit 203 is called a detected region. Note that, since an image defect such as a false pattern is likely to occur in the detected region, the detected region may be called a defect region.

Note that the detecting unit 203 may detect a region having a hue similar to the hue of the defect region from the mosaic image acquired by the image acquiring unit 201. Such a configuration is equivalent to the detection of a detected region based on pixels of the first demosaic image that were not subjected to interpolation in the first demosaicing process. Accordingly, it can be said that, even in such a configuration, a region having a hue similar to the hue of the defect region is detected from the first demosaic image.

The image combining unit 205 combines the first demosaic image and the second demosaic image. Here, the image combining unit 205 can combine the second demosaic image with the detected region in the first demosaic image detected by the detecting unit 203. That is the composite image obtained by combining the first demosaic image and the second demosaic image includes the second demosaic image at the position of the detected region and includes the first demosaic image outside the detected region.

The processes performed by the image processing apparatus 100 according to the present embodiment will be described with reference to the flowcharts in FIGS. 6A and 6B. The processes in these flowcharts can be realized by a processor such as the CPU 101 executing programs stored in a memory such as the RAM 102 or the HDD 103. Note that the processes in FIGS. 6A and 6B may be performed by different apparatuses.

Figure 6A:
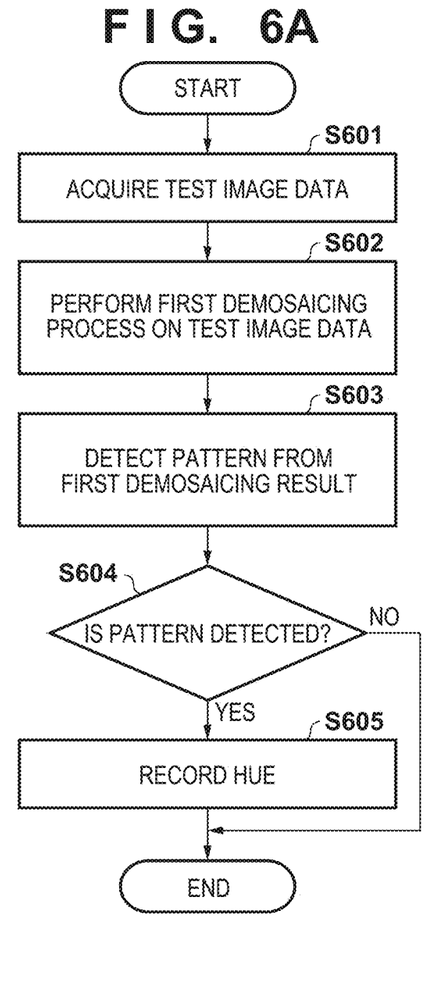
FIGS. 6A and 6B are flowcharts illustrating a flow of image processing according to one embodiment.

FIG. 6A illustrates a process in which a hue of a defect region is determined using test image data. The process in FIG. 6A can be performed on each of a plurality of test images.

In step S601, the test image acquiring unit 501 acquires test image data from the image-capturing apparatus 105, the HDD 103, the external memory 107, or the like. Furthermore, as described above, the test image acquiring unit 501 outputs test mosaic image data from the test image data. The test image acquiring unit 501 may perform preprocessing such as a white balance process or an offset-adding process on the test mosaic image data.

In step S602, as described above, the first demosaicing unit 202 outputs test demosaic image data in which color information has been interpolated by performing the first demosaicing process, in which the trained model output by the training processing apparatus 110 is used.

In step S603, the detecting unit 503 detects a defect region from the test demosaic image data using a method similar to that used in step S303.

In step S604, the detecting unit 503, using a method similar to that used in step S304, determines whether or not a defect region has been detected from the test demosaic image data. Processing proceeds to step S605 if a defect region has been detected, and otherwise proceeds to step S606.

In step S605, as described above, the analyzing unit 504 extracts a hue value of the defect region detected in step S603, and records the hue value to the hue information file. Hue values corresponding to the number of defect regions that have been detected can be recorded to the hue information file. Here, the recording can be skipped if the hue value detected in step S605 is similar to an already-recorded hue value. Note that, if the defect region includes a plurality of colors, the analyzing unit 504 can record information (for example, a hue value) of each color. As a different method, the analyzing unit 504 may create a histogram of colors of pixels in the defect region, and record the most frequently appearing hue value.

Figure 6B:
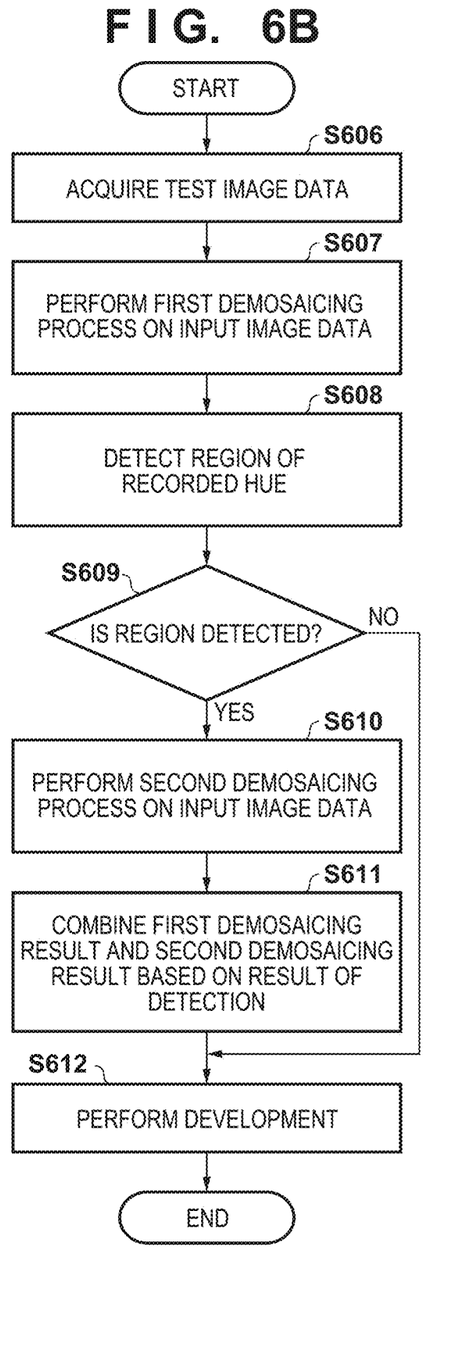

FIG. 6B illustrates a demosaicing process performed on RAW image data. The processing in steps S606 and S607 is similar to that in steps S301 and S302 in embodiment 1.

In step S608, the detecting unit 203 detects, from the first demosaic image, a region (detected region) having a hue similar to the hue recorded in the hue information file. For example, the detecting unit 203 can convert the first demosaic image from the RGB color space into the HSV color space. Then, the detecting unit 203 can detect a region in the first demosaic image that has a hue within the range of $X \pm \alpha$. Here, the hue value X is the hue value (0 to 180) recorded in the hue information file, and a is an arbitrarily defined value. In such a manner, the detecting unit 203 can detect a region having a hue that is within a predetermined range from the hue recorded in the hue information file. If a plurality of hue values are recorded in the hue information file, the detecting unit 203 can detect a region having a hue that is within a predetermined range from one of the hues recorded in the hue information file.

In step S609, the detecting unit 203 determines whether or not a detected region is present in the first demosaic image. Processing proceeds to step S610 if a detected region is present, and otherwise proceeds to step S612.

The processing in step S610 is similar to that in step S305 in embodiment 1. The processing in step S611 is also similar to that in step S306 in embodiment 1, and the second demosaic image can be combined with the detected region detected from the first demosaic image. The processing in step S612 is also similar to that in step S307 in embodiment 1. Note that, similarly to embodiment 1, the first demosaicing process (step S607) and the second demosaicing process (step S610) may be performed in parallel, and the second demosaicing process may be performed only on a part of the mosaic image corresponding to the detected region detected in step S608.

In the above-described embodiment, a region having a hue similar to the hue of the defect region was detected, and the second demosaic image was combined with this region. On the other hand, the present inventor found out that an image defect such as a false pattern is likely to occur especially if some regions of an image have a specific hue and a different region of the image has a different specific hue. Thus, the detecting unit 503 may detect and record a combination of a hue of a defect region and a hue of regions other than the defect region. In this case, the detecting unit 503 may create a histogram of hues of pixels outside the defect region, and record the most frequently appearing hue value. In such an embodiment, the detecting unit 203 can determine a region with which the second demosaic image is to be combined based on the combination of the hue of the defect region and the hue outside the defect region. For example, the detecting unit 203 can detect a region having a hue similar to the hue of the defect region determined by the analyzing unit 504, and determine whether or not to combine the second demosaic image with the detected region based on the hue of the regions other than the detected region and the recorded hue of the regions other than the defect region. Specifically, the detecting unit 203 can create a histogram of hues of pixels outside the detected region. Then, the detecting unit 203 can determine that the second demosaic image is to be combined with the detected region if the most frequently appearing hue value is similar to the recorded hue value of the regions outside the defect region.

In such a manner, according to the present embodiment, a false pattern can be effectively suppressed by specifying in advance a hue with which a false pattern is likely to occur as a result of the first demosaicing process, which is obtained using the trained model, and applying the result of a different demosaicing process to a region having the specified hue.

OTHER EXAMPLES

In the above-described embodiments, examples in which a specific pattern as illustrated in FIGS. 7A and 7B is detected from the first demosaic image has been described. On the other hand, a process for detecting the specific pattern may be further performed on the second demosaic image. This process can be performed similarly to steps S303 and S603. In this case, it can be determined that a false pattern has been detected from the first demosaic image if the specific pattern detected from the first demosaic image is not detected from the corresponding position in the second demosaic image. Accordingly, the region having the specific pattern detected from the first demosaic image is determined as a defect region. On the other hand, it can be determined that a real pattern has been detected from the first demosaic image if the specific pattern detected from the first demosaic image is also detected from the corresponding position in the second demosaic image, in which case this region can be prevented from being determined as a defect region. According to such a configuration, a situation in which the detecting units 203 and 503 determine a region in which a real checkered pattern is present as a defect region can be prevented.

In embodiment 1, the second demosaic image is combined with a region of the first demosaic image in which a specific pattern is detected. However, the method for correcting the first demosaic image is not limited to this method. For example, an image processing apparatus according to one embodiment includes a detecting unit 203 that detects a region having a checkered pattern from a mosaic image, in addition to the image acquiring unit 201 and the first demosaicing unit 202 in embodiment 1. The detecting unit 203 can detect a checkered pattern using a method similar to that used in embodiment 1. Furthermore, this image processing apparatus includes a correcting unit (unillustrated) that performs a correction process on the detected region in the first demosaic image, in which a checkered pattern has been detected. This correction unit may correct the portion in which a checkered pattern has been detected by combining the second demosaic image with this portion, similarly to embodiment 1. On the other hand, this correcting unit may correct the portion in which a checkered pattern has been detected by subjecting this portion to a smoothing process in which a median filter or the like is used. In such a manner, the correcting unit can perform a correction process for suppressing a checkered pattern on the portion in which a checkered pattern has been detected.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105036, filed Jun. 24, 2021, which is hereby incorporated by reference herein in its entirety.

What is claimed is:

1. An image processing apparatus comprising one or more processors and one or more memories storing one or more programs which cause the one or more processors to:
   acquire a mosaic image;
   generate a first demosaic image by subjecting the mosaic image to a first demosaicing process in which a neural network is used;
   generate a second demosaic image by subjecting the mosaic image to a second demosaicing process that is different from the first demosaicing process;
   generate a test demosaic image by subjecting a test mosaic image to the first demosaicing process;
   detect a region having a specific pattern from the test demosaic image;
   record hue information of the detected region as information indicating a specific hue;
   detect a region having the specific hue from the first demosaic image as a detected region; and
   generate a composite image in which the first demosaic image and the second demosaic image are combined, by combining, with the detected region in the first demosaic image, a corresponding portion of the second demosaic image.

2. The image processing apparatus according to claim 1, wherein the composite image includes the second demosaic image at the position of the detected region and includes the first demosaic image outside the detected region.

3. The image processing apparatus according to claim 2, wherein the composite image further includes, in the periphery of the detected region, an image in which the first demosaic image and the second demosaic image are blended.

4. The image processing apparatus according to claim 1, wherein the one or more programs cause the one or more processors to detect a region having a specific pattern as the detected region.

5. The image processing apparatus according to claim 4, wherein the specific pattern is a checkered pattern.

6. The image processing apparatus according to claim 4, wherein
   the mosaic image is a RAW image that is based on a predetermined color pattern, and
   the specific pattern is a pattern that is correlated with the predetermined color pattern.

7. The image processing apparatus according to claim 4, wherein the mosaic image is a RAW image that is based on a Bayer pattern, and the one or more programs cause the one or more processors to:
   generate the first demosaic image for each of an R channel, a G channel, and a B channel;
   detect the intensity of the specific pattern from the first demosaic image for each of the R, G, and B channels; and
   detect the detected region based on the intensity detected for each of the R, G, and B channels such that a weight of the intensity detected for the G channel is greater than weights of the intensity detected for the R and B channels.

8. The image processing apparatus according to claim 1, wherein the one or more programs cause the one or more processors to perform the second demosaicing process on a part of the mosaic image that corresponds to the detected region.

9. The image processing apparatus according to claim 1, wherein the one or more programs cause the one or more processors to perform the first demosaicing process and the second demosaicing process in parallel.

10. An image processing method comprising:
    acquiring a mosaic image;
    generating a first demosaic image by subjecting the mosaic image to a first demosaicing process in which a neural network is used;
    generating a second demosaic image by subjecting the mosaic image to a second demosaicing process that is different from the first demosaicing process; and
    generating a test demosaic image by subjecting a test mosaic image to the first demosaicing process;
    detecting a region having a specific pattern from the test demosaic image;
    recording hue information of the detected region as information indicating a specific hue,
    detecting a region having the specific hue from the first demosaic image as a detected region; and
    generating a composite image in which the first demosaic image and the second demosaic image are combined, by combining, with the detected region in the first demosaic image, a corresponding portion of the second demosaic image.

11. A non-transitory computer-readable medium storing one or more programs which, when executed by a computer comprising one or more processors and one or more memories, cause the computer to:
    acquire a mosaic image;
    generate a first demosaic image by subjecting the mosaic image to a first demosaicing process in which a neural network is used;
    generate a second demosaic image by subjecting the mosaic image to a second demosaicing process that is different from the first demosaicing process;
    generate a test demosaic image by subjecting a test mosaic image to the first demosaicing process;
    detect a region having a specific pattern from the test demosaic image;
    record hue information of the detected region as information indicating a specific hue;
    detect a region having the specific hue from the first demosaic image as a detected region; and
    generate a composite image in which the first demosaic image and the second demosaic image are combined, by combining, with the detected region in the first demosaic image, a corresponding portion of the second demosaic image.

* * * * *